United States Patent
Wickenkamp

(10) Patent No.: US 9,807,436 B2
(45) Date of Patent: Oct. 31, 2017

(54) SYSTEMS AND METHODS FOR PROVIDING MEDIA ASSET RECOMMENDATIONS FOR A GROUP

(71) Applicant: United Video Properties, Inc., Santa Clara, CA (US)

(72) Inventor: Vanessa Wickenkamp, Elmhurst, IL (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

(21) Appl. No.: 14/338,471

(22) Filed: Jul. 23, 2014

(65) Prior Publication Data
US 2016/0029057 A1 Jan. 28, 2016

(51) Int. Cl.
- H04N 21/25 (2011.01)
- H04N 21/262 (2011.01)
- H04N 21/482 (2011.01)
- H04N 21/475 (2011.01)

(52) U.S. Cl.
CPC ..... *H04N 21/252* (2013.01); *H04N 21/26283* (2013.01); *H04N 21/4756* (2013.01); *H04N 21/4826* (2013.01)

(58) Field of Classification Search
CPC .......... H04N 21/252; H04N 21/4826
See application file for complete search history.

(56) References Cited

U.S. PATENT DOCUMENTS

| | | | |
|---|---|---|---|
| 2,700,065 | A | 1/1955 | Evans |
| 2,851,550 | A | 9/1958 | Searcy |
| 2,856,474 | A | 10/1958 | Norris |
| 3,879,332 | A | 4/1975 | Leone |

(Continued)

FOREIGN PATENT DOCUMENTS

| | | |
|---|---|---|
| AU | 21592/88 | 3/1989 |
| FR | 2 678 091 | 12/1992 |

(Continued)

OTHER PUBLICATIONS

"Addressable Converters: A New Development at Cable Data," Via Cable, vol. 1, No. 12, Dec. 1981, Cable Data, Sacramento, California.

(Continued)

*Primary Examiner* — Brian T Pendleton
*Assistant Examiner* — Frank Johnson-Calderon
(74) *Attorney, Agent, or Firm* — Haley Guiliano LLP

(57) ABSTRACT

Systems and methods are described herein for providing media recommendations for a group. A media guidance application may identify a group comprising at least a first user and a second user and select a media asset of which the first and second users have previously accessed less than a duration of the media asset. For example, each of the first and the second users may have watched only a respective portion of the media asset. The media guidance application may determine a first amount of the media asset duration that the first user has accessed the media asset and a second amount of the media asset duration that the second user has accessed the media asset. Based on the first and second amounts of the media asset duration, the media guidance application may provide a recommendation for the media asset to the group.

18 Claims, 8 Drawing Sheets

(56) References Cited

U.S. PATENT DOCUMENTS

| | | | |
|---|---|---|---|
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |
| 4,390,901 A | 6/1983 | Keiser |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Kru/ ger et al. |
| 4,488,764 A | 12/1984 | Pfenning et al. |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohorn |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,718,107 A | 1/1988 | Hayes |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hegendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith et al. |
| 4,903,031 A | 2/1990 | Yamada |
| 4,930,158 A | 5/1990 | Vogel |
| 4,930,160 A | 5/1990 | Vogel |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto |
| 5,168,353 A | 12/1992 | Walker et al. |
| 5,172,111 A | 12/1992 | Olivo, Jr. |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,382,983 A | 1/1995 | Kwoh et al. |
| 5,384,910 A | 1/1995 | Torres |
| 5,396,546 A | 3/1995 | Remillard |
| 5,425,101 A | 6/1995 | Woo et al. |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A | 1/1996 | Hunter et al. |
| 5,548,345 A | 8/1996 | Brian et al. |
| 5,550,575 A | 8/1996 | West et al. |
| 5,557,724 A | 9/1996 | Sampat et al. |
| 5,579,055 A | 11/1996 | Hamilton et al. |
| 5,583,560 A | 12/1996 | Florin et al. |
| 5,583,576 A | 12/1996 | Perlman et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,621,456 A | 4/1997 | Florin et al. |
| 5,629,733 A | 5/1997 | Youman et al. |
| 5,664,046 A | 9/1997 | Abecassis |
| 5,699,104 A | 12/1997 | Yoshinobu |
| 5,716,273 A | 2/1998 | Yuen |
| 5,751,335 A | 5/1998 | Shintani |
| 5,781,246 A | 7/1998 | Alten et al. |
| 5,907,831 A | 5/1999 | Lotvin et al. |
| 5,949,471 A | 9/1999 | Yuen et al. |
| 5,969,748 A | 10/1999 | Casement et al. |
| 6,072,520 A | 6/2000 | Yuen et al. |
| 6,115,057 A | 9/2000 | Kwoh et al. |
| 6,144,401 A | 11/2000 | Casement et al. |
| 6,321,381 B1 | 11/2001 | Yuen et al. |
| 6,698,019 B1 | 2/2004 | Kim et al. |
| 6,744,967 B2 | 6/2004 | Kaminski et al. |
| 6,767,212 B2 | 7/2004 | Thomas |
| 6,850,691 B1 | 2/2005 | Stam et al. |
| 6,922,843 B1 | 7/2005 | Herrington et al. |
| 7,130,616 B2 | 10/2006 | Janik |
| 7,185,355 B1 | 2/2007 | Ellis et al. |
| 7,305,436 B2 | 12/2007 | Willis |
| 7,320,025 B1 | 1/2008 | Steinberg et al. |
| 7,396,281 B2 | 7/2008 | Mendelsohn et al. |
| 7,644,427 B1* | 1/2010 | Horvitz ............. H04H 60/37 725/13 |
| 7,716,704 B2 | 5/2010 | Wang et al. |
| 7,886,327 B2 | 2/2011 | Stevens |
| 7,890,599 B2 | 2/2011 | Kalmanje et al. |
| 8,051,081 B2 | 11/2011 | Shahraray et al. |
| 8,302,130 B2* | 10/2012 | Irwin ............ H04N 5/44543 370/464 |
| 8,365,213 B1* | 1/2013 | Orlowski ........... G06Q 30/0251 725/13 |
| 8,539,331 B2 | 9/2013 | Pettit et al. |
| 8,640,177 B2 | 1/2014 | Bhogal et al. |
| 2002/0016971 A1 | 2/2002 | Berezowski et al. |
| 2002/0095673 A1 | 7/2002 | Leung et al. |
| 2002/0122052 A1 | 9/2002 | Reich et al. |
| 2002/0174428 A1 | 11/2002 | Agnihotri et al. |
| 2003/0103079 A1 | 6/2003 | Adatia et al. |
| 2003/0115593 A1 | 6/2003 | Alten et al. |
| 2003/0146915 A1 | 8/2003 | Brook et al. |
| 2003/0149980 A1 | 8/2003 | Hassell et al. |
| 2003/0149988 A1 | 8/2003 | Ellis et al. |
| 2003/0237088 A1 | 12/2003 | Macrae et al. |
| 2003/0237093 A1 | 12/2003 | Marsh |
| 2004/0019903 A1 | 1/2004 | Knudson et al. |

(56) References Cited

U.S. PATENT DOCUMENTS

| | | |
|---|---|---|
| 2004/0060063 A1 | 3/2004 | Russ et al. |
| 2004/0075694 A1 | 4/2004 | Partridge et al. |
| 2004/0098744 A1 | 5/2004 | Gutta |
| 2004/0103434 A1 | 5/2004 | Ellis |
| 2004/0128681 A1 | 7/2004 | Hancock et al. |
| 2004/0199923 A1 | 10/2004 | Russek |
| 2004/0215718 A1 | 10/2004 | Kazmi et al. |
| 2005/0005308 A1 | 1/2005 | Logan et al. |
| 2005/0114374 A1 | 5/2005 | Juszkiewicz et al. |
| 2005/0125822 A1 | 6/2005 | Casement et al. |
| 2005/0147247 A1 | 7/2005 | Westberg et al. |
| 2005/0154988 A1 | 7/2005 | Proehl et al. |
| 2005/0166230 A1 | 7/2005 | Gaydou et al. |
| 2005/0166258 A1* | 7/2005 | Vasilevsky ............ G11B 27/00 725/138 |
| 2005/0177846 A1 | 8/2005 | Maruyama et al. |
| 2005/0246738 A1 | 11/2005 | Lockett et al. |
| 2006/0020662 A1 | 1/2006 | Robinson |
| 2006/0112082 A1 | 5/2006 | Platt et al. |
| 2006/0263041 A1* | 11/2006 | Gustta ................. H04N 5/44543 386/237 |
| 2006/0267995 A1 | 11/2006 | Radloff et al. |
| 2007/0028267 A1 | 2/2007 | Ostojic et al. |
| 2007/0186241 A1 | 8/2007 | Sugimoto et al. |
| 2007/0204287 A1 | 8/2007 | Conradt et al. |
| 2007/0300184 A1 | 12/2007 | Song |
| 2008/0022295 A1* | 1/2008 | Fukumiya ............ G11B 31/006 725/10 |
| 2009/0133090 A1 | 5/2009 | Busse |
| 2010/0169927 A1* | 7/2010 | Yamaoka ........... H04N 5/44543 725/46 |
| 2010/0191631 A1* | 7/2010 | Weidmann .............. G06F 3/013 705/34 |
| 2010/0235386 A1 | 9/2010 | Zhao et al. |
| 2010/0262986 A1* | 10/2010 | Adimatyam ........... H04H 60/46 725/9 |
| 2010/0269139 A1* | 10/2010 | Kim ................... H04N 5/44543 725/50 |
| 2011/0173662 A1* | 7/2011 | Beppu .................. H04N 21/466 725/46 |
| 2012/0117017 A1* | 5/2012 | Phillips ............ H04N 21/44204 706/50 |
| 2012/0151511 A1* | 6/2012 | Bernard ................. H04H 60/37 725/10 |
| 2013/0247081 A1* | 9/2013 | Vinson ............. H04N 21/44204 725/14 |
| 2013/0268651 A1* | 10/2013 | Greenzeiger ........ H04N 21/252 709/224 |
| 2013/0297706 A1* | 11/2013 | Arme ................ G06F 17/30038 709/206 |
| 2014/0101706 A1* | 4/2014 | Kardatzke .......... H04N 21/4334 725/86 |
| 2014/0149555 A1* | 5/2014 | Bank ..................... H04L 65/602 709/219 |
| 2014/0195647 A1* | 7/2014 | Chen ....................... H04L 67/10 709/219 |
| 2014/0223480 A1* | 8/2014 | Berry ................ H04N 21/4668 725/40 |
| 2014/0259040 A1* | 9/2014 | Han ................. H04N 21/25883 725/14 |

FOREIGN PATENT DOCUMENTS

| | | |
|---|---|---|
| GB | 2 209 417 | 5/1989 |
| GB | 2 210 526 | 6/1989 |
| GB | 2 215 928 | 9/1989 |
| WO | WO-86/01962 | 3/1986 |
| WO | WO-89/12370 | 12/1989 |
| WO | WO-90/15507 | 12/1990 |
| WO | WO-93/11638 | 6/1993 |
| WO | WO-93/11639 | 6/1993 |
| WO | WO-93/11640 | 6/1993 |
| WO | WO-00/59214 A1 | 10/2000 |
| WO | WO-03/051043 A1 | 6/2003 |
| WO | WO-2010018991 A2 | 2/2010 |

OTHER PUBLICATIONS

"A New Approach to Addressability," CableData product brochure, Cable Data, Sacramento, California, undated.

Brugliera, Vito, "Digital On-Screen Display—A New Technology for the Consumer Interface," Symposium Record Cable Sessions of the 18th International Television Symposium & Technical Exhibition, Jun. 1993, pp. 571-586.

CableComputer User's Guide, bearing a date of Dec. 1985 (Plaintiff's Exhibit 289).

CableData, Roseville Consumer Presentation, Mar. 1986.

Committee on Commerce, "Communications Act of 1995," XP-002100790 Jul. 1995, pp. 1-4.

Common Sense Media Inc. CSM Family Friendly Reviews (from http://www.commonsensemedia.org/index.php).

Daniel F. Walsh Jr., Timing Considerations in RF Two Way Data Collection and Polling, Jerrold-Applies Media Lab, 1989 NCTA Technical Papers, pp. 47-56, 1989.

Daniel H. Smart, Innovative Aspects of a Switched Star Cabled Television Distribution System, British Cable Services Limited, 1987 NCTA Technical Papers, pp. 26-35, 1987.

Federal Communications Commission, In the Telecommunications Act of 1996, Public Law 104-104, effective Feb. 8, 1996, in Section 551, "Parental Choice in Television Programming," XP-002100791.

Gary Libman, Times Staff Writer Chaining the Channels, A New Generation of Television Blocking Systems Allows More Options for Parent, Seeking to Control Kids' Viewing, Los Angeles Times, Aug. 9, 1993.

Gregory F. Vaeth, John Feras, Enertec, Inc., The Addressable Controller of the Future, *General Instruments/Jerrold Communication*, 1990 NCTA Technical Papers, pp. 274-279, 1990.

ISO/TC 46/SC 9: Additional Revision to ISO/CD 15706, ISAN, Oct. 5, 1999, Video Standards and Drafts.

Jerrold Communications Publication, "Cable Television Equipment," dated 1992 and 1993, pp. 8-2.1 to 8-6 and 8-14.1 to 8-14.3.

M/A-COM, Inc., "Videocipher II Satellite Descrambler Owner's Manual," dated prior to Feb. 1986.

Michael Dufresne, "New Services: An Integrated Cable Network's Approach, Videotron Communication LTEE," *Technical Papers of NCTA 31st Annual Convention & Exposition*, pp. 156-160 (1982).

Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.

Roisin, C., "Authoring Structured Multimedia Documents", SOFSEM: Theory and Practice of Informatics, Conference on Current Trends in Theory and Practice of Informatics, Proceedings, XX, Nov. 21, 1998, pp. 222-239 Abstract.

Roseville City Council Presentation, bearing a date of Mar. 13, 1985 (Defendant's Exhibit 26).

Sezan, I et al., "TV Anytime Forum Metadata Requirements", Mar. 10, 2000, Video Standards and Drafts.

*StarSight Telecast Inc. User's Guide*, pp. 1-20 (1994).

T. Rzeszewski et al., "A Microcomputer Controlled Frequency Synthesizer for TV." Reprinted from *IEEE Trans. Consum. Electron*, vol. CE-24, pp. 145-153 (1978).

Videocipher Owner's Manual, M/A-Com., Publication No. 4096-048; Model No. VC-2000E or VC-2000E/B, undated.

"Weststar and Videotoken Network Present the CableComputer" (Plaintiff's Exhibit 334 dated Sep. 19, 1995).

\* cited by examiner

Group Assets

| Assets | Progress Bar | Available Source | User Overlap | Furthest Watched | Genre |
|---|---|---|---|---|---|
| 1. Friends ▣ | ▬▬▬ | 7pm TBS | 25% | 55% | Comedy |
| 2. Law & Order | ▬▬▬ | 8pm TNT | 30% | 55% | Drama |
| 3. Simpsons | ▬▬▬ | 6:30pm FOX | 35% | 55% | Comedy |
| 4. American Idol | ▬▬▬✱▬ | VOD | 30% | 40% | Reality |

Key
▢ Tom
▣ Jerry
✱ Critical Portion

902
Identify a group comprising at least a first user and a second user

904
Select a media asset of which the first and second users have previously accessed less than a duration of the media asset

906
Determine a first amount of the media asset duration that the first user has accessed the media asset

908
Determine a second amount of the media asset duration that the second user has accessed the media asset

910
Based on the first and second amounts of the media asset duration, provide a recommendation for the media asset to the group

FIG. 9

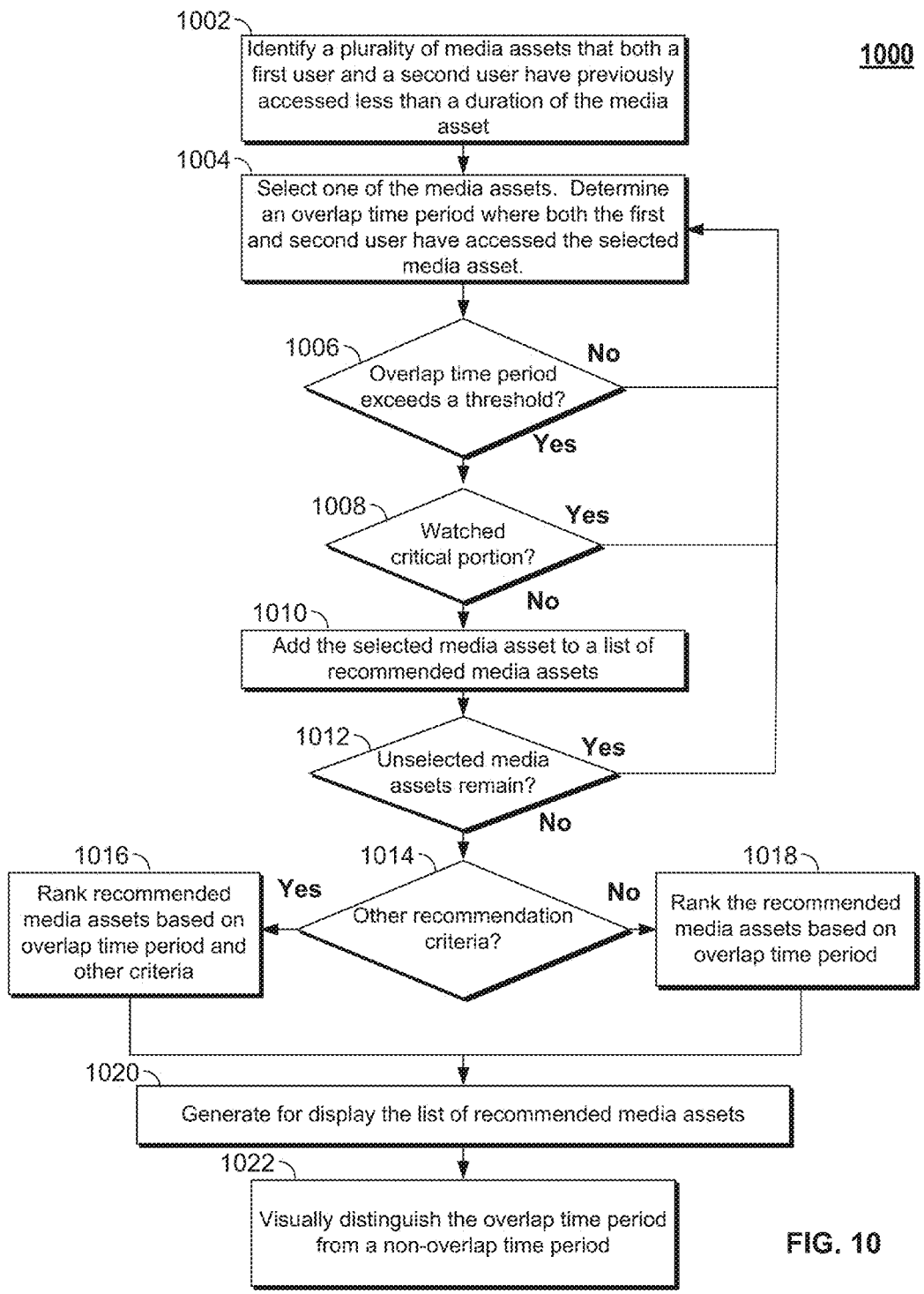

SYSTEMS AND METHODS FOR PROVIDING MEDIA ASSET RECOMMENDATIONS FOR A GROUP

BACKGROUND

Media assets are often consumed by a group of people, but given the large amount of media available today, it can be difficult to choose a suitable media asset that appeals to everyone's preferences in the group and takes into account prior viewing histories. Traditional systems offer search features that may be used to browse for desirable media assets, but these traditional systems require the user to manually browse a list of assets and lack the ability to target the group with media assets that are relevant to each individual in the group. For example, one user may have watched the first five minutes of a television program, a second user may have watched the first ten minutes of the same television program, and a third user may have watched the last five minutes of the same television program. A recommendation to the first and the second users may be appropriate based on their common viewing of the first five minutes, but a recommendation for the media asset to all three users may not be ideal because the third user has not seen the first five minutes of the program.

SUMMARY

Accordingly, systems and methods are described herein for providing media recommendations for a group. In some aspects, a media guidance application may perform a method for providing media recommendations. The media guidance application may identify a group comprising at least a first user and a second user and select a media asset of which the first and second users have previously accessed less than a duration of the media asset. For example, each of the first and the second users may have watched only a respective portion of the media asset. The media guidance application may determine a first amount of the media asset duration that the first user has accessed the media asset and a second amount of the media asset duration that the second user has accessed the media asset. In some embodiments, the first amount of the media asset duration and the second amount of the media asset duration are less than the entire duration of the media asset. Based on the first and second amounts of the media asset duration, the media guidance application may provide a recommendation for the media asset to the group.

In some embodiments, the media guidance application may provide the recommendation for the media asset to the group by determining a difference between the first and the second amounts of the media asset duration. For example, the media guidance application may take the difference between the first and second amounts of the media asset duration and decide whether the media asset would be an appropriate recommendation. If the difference is too large or too small, based on a threshold value, the media guidance application may not recommend the media asset. The media guidance application may determine a difference between a stop time of the first amount of the media asset duration and a stop time of the second amount of the media asset duration or the difference between a start time of the first amount of the media asset duration and a start time of the second amount of the media asset duration.

In some embodiments, the media guidance application may determine whether the difference between the first amount of the media asset duration and the second amount of the media asset duration is below a threshold. For example, if the first user has watched a relatively large portion of the media asset while the second user has watched a relatively small portion of the media asset, then a group recommendation for the media asset may not be appropriate. In some embodiments, the media guidance application may determine an overlap time period in the media asset where both the first user and the second user have accessed the media asset based on the first and the second amounts of the media asset duration. The media guidance application may also determine a non-overlap time period in the media asset where at least one of the first user and the second user have not accessed the media asset. If the overlap period exceeds a certain threshold, then the media guidance application may provide a group recommendation for the media asset. For example, if the first user and the second user have both watched a portion of the media asset, for instance the first five minutes, then a recommendation for the media asset may be appropriate for the group.

In some embodiments, the media guidance application may generate for display the first amount of the media asset duration and the second amount of the media asset duration. For example, the first and the second amounts of the media asset duration may be displayed in a bar graph. The first and the second amounts of the media asset may be distinguished or highlighted in any suitable manner, such as differing colors, shadings, patterns, or placements. In some embodiments, the overlap time period, representing the portion of the media asset that both the first and the second user have consumed, may be visually distinguished from a non-overlap period in any suitable manner.

In some embodiments, the media guidance application may provide a group recommendation for a single media asset. In other embodiments, the media guidance application may provide a recommendation for a plurality of assets. In such embodiments, the media guidance application may determine, for each media asset in a plurality of media assets, an amount of time that the first and the second user has accessed of each media asset. The media guidance application may further rank the plurality of media assets based on the amount of time that the first user has accessed each media asset and the amount of time that the second user has accessed each media asset. For example, the media guidance application may provide a ranked list of the plurality of media assets, in descending/ascending order of amount of overlap time.

In some embodiments, the media guidance application may receive an indication of interest in the media asset from at least one of the first user and the second user. For example, the first and the second user may mark certain media assets that they are interested in or intend to consume in the future. In some embodiments, the media guidance application may take into account these indications of interests in the group recommendations. For instance, only programs that either the first or the second user have previously indicated an interest in may be included in the recommendation.

In some embodiments, the media guidance application may determine whether at least one of the first user or the second user has accessed a critical portion of the media asset. If at least one of the first or the second user has accessed the critical portion of the media asset, then the media guidance application may exclude the media asset from the group recommendation. For example, the television show "American Idol" may reveal the winner of the episode at a certain point in time media asset. If one of the first or the second user has seen that part of the show and already knows the winner, then the show may not be appropriate for watching with the group because the suspense will be reduced.

In some embodiments, a group may manually request a group recommendation by indicating who is in the group and other recommendation criteria. In other embodiments, the media guidance application may automatically provide the group recommendations without user input. For instance, the group recommendations may be overlaid on an electronic program guide, such as a grid guide. In some embodiments, the media guidance application may overlay icons that indicate that certain listings are suitable for watching with the group. The icons may represent each individual in the suggested group. In some embodiments, the media guidance application may also provide progress bars for one or more media assets that include indicators to show how far and which portions of the media asset(s) each individual in the suggested group has consumed. The progress bar plus user indicators may be displayed or overlaid in any suitable location, such as on top of a traditional grid guide, overlaid onto a currently displayed program, or overlaid onto media asset listings in a list of assets stored on a DVR.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 shows an illustrative screen for providing group asset recommendations in accordance with some embodiments of the disclosure;

FIG. 9 is a flowchart of illustrative steps for providing a recommendation for a media asset to a group in accordance with some embodiments of the disclosure; and FIG. 10 is a flowchart of another set of illustrative steps for providing a recommendation for media assets to a group in accordance with some embodiments of the disclosure.

DETAILED DESCRIPTION OF THE DRAWINGS

Figure 1:
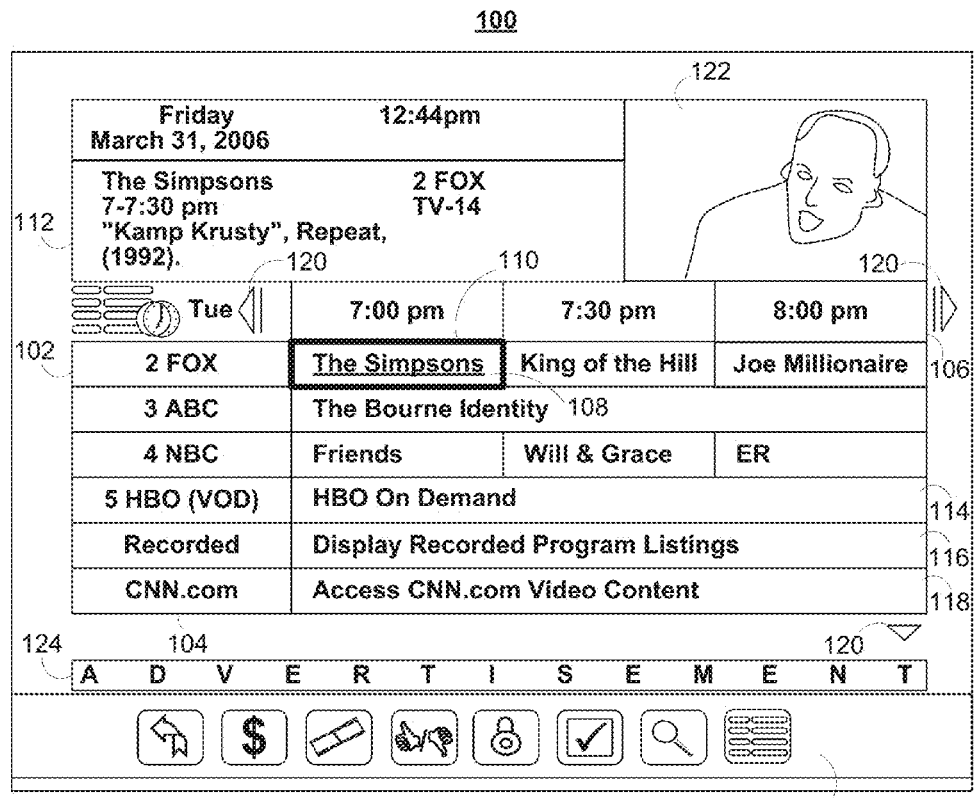
FIG. 1 shows an illustrative example of a display screen for use in accessing media content in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Systems and methods are described herein for providing media recommendations for a group. In some aspects, a media guidance application may perform a method for providing media recommendations. The media guidance application may identify a group comprising at least a first user and a second user and select a media asset of which the first and second users have previously accessed less than a duration of the media asset. For example, each of the first and the second users may have watched only a respective portion of the media asset. The media guidance application may determine a first amount of the media asset duration that the first user has accessed the media asset and a second amount of the media asset duration that the second user has accessed the media asset. In some embodiments, the first amount of the media asset duration and the second amount of the media asset duration are less than the entire duration of the media asset. Based on the first and second amounts of the media asset duration, the media guidance application may provide a recommendation for the media asset to the group.

For illustrative purposes, the systems and methods described herein are discussed in relation to video media, such as television programs or movies. It will be understood by one of ordinary skill in the art that the systems and methods described herein may also be used with any type of media asset, including, but not limited to, video, audio, still pictures, and text media. Furthermore, for ease of illustration, the examples described herein are discussed in relation to a group of two people: a first and a second user. However, the systems and methods described herein may be implemented for a group of any number of people, as will be understood by one of ordinary skill in the art.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, text documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance application may provide the recommendation for the media asset to the group by determining a difference between the first and the second amounts of the media asset duration. For example, the media guidance application may take the difference between the first and second amounts of the media asset duration and decide whether the media asset would be an appropriate recommendation. If the difference is too large or too small, based on a threshold value, the media guidance application may not recommend the media asset. The media guidance application may determine a difference between a stop time of the first amount of the media asset duration and a stop time of the second amount of the media asset duration or the difference between a start time of the first amount of the media asset duration and a start time of the second amount of the media asset duration.

In some embodiments, the media guidance application may determine whether the difference between the first amount of the media asset duration and the second amount of the media asset duration is below a threshold. For example, if the first user has watched a relatively large portion of the media asset while the second user has watched a relatively small portion of the media asset, then a group recommendation for the media asset may not be appropriate. In some embodiments, the media guidance application may determine an overlap time period in the media asset where both the first user and the second user have accessed the media asset based on the first and the second amounts of the media asset duration. The media guidance application may also determine a non-overlap time period in the media asset where at least one of the first user and the second user have not accessed the media asset. If the overlap period exceeds a certain threshold, then the media guidance application may provide a group recommendation for the media asset. For example, if the first user and the second user have both watched a portion of the media asset, for instance the first five minutes, then a recommendation for the media asset may be appropriate for the group.

In some embodiments, the media guidance application may generate for display the first amount of the media asset duration and the second amount of the media asset duration. For example, the first and the second amounts of the media asset duration may be displayed in a bar graph. The first and the second amounts of the media asset may be distinguished or highlighted in any suitable manner, such as differing colors, shadings, patterns, or placements. In some embodiments, the overlap time period, representing the portion of the media asset that both the first and the second user have consumed, may be visually distinguished from a non-overlap period in any suitable manner.

In some embodiments, the media guidance application may provide a group recommendation for a single media asset. In other embodiments, the media guidance application may provide a recommendation for a plurality of assets. In such embodiments, the media guidance application may determining, for each media asset in a plurality of media assets, an amount of time that the first user has accessed of each media asset and an amount of time that the second user has accessed of each media asset. The media guidance application may further rank the plurality of media assets based on the amount of time that the first user has accessed each media asset and the amount of time that the second user has accessed each media asset. For example, the media guidance application may provide a ranked list of the plurality of media assets, in descending/ascending order of amount of overlap time.

In some embodiments, the media guidance application may receive an indication of interest in the media asset from at least one of the first user and the second user. For example, the first and the second user may mark certain media assets that they are interested in or intend to consume in the future. In some embodiments, the media guidance application may take into account these indications of interests in the group recommendations. For instance, only programs that either the first or the second user have previously indicated an interest in may be included in the recommendation.

In some embodiments, the media guidance application may determine whether at least one of the first user or the second user has accessed a critical portion of the media asset. If at least one of the first or the second user has accessed the critical portion of the media asset, then the media guidance application may exclude the media asset from the group recommendation. For example, the television show "American Idol" may reveal the winner of the episode at a certain point in time media asset. If one of the first or the second user has seen that part of the show and already knows the winner, then the show may not be appropriate for watching with the group because the suspense will be reduced.

In some embodiments, a group may manually request a group recommendation by indicating who is in the group and other recommendation criteria. In other embodiments, the media guidance application may automatically provide the group recommendations without user input. For instance, the group recommendations may be overlaid on an electronic program guide, such as a grid guide. In some embodiments, the media guidance application may overlay icons that indicate that certain listings are suitable for watching with the group. The icons may represent each individual in the suggested group. In some embodiments, the media guidance application may also provide progress bars for one or more media assets that include indicators to show how far and which portions of the media asset(s) each individual in the suggested group has consumed. The progress bar plus user indicators may be displayed or overlaid in any suitable location, such as on top of a traditional grid guide, or overlaid onto a currently displayed program.

Figure 2:
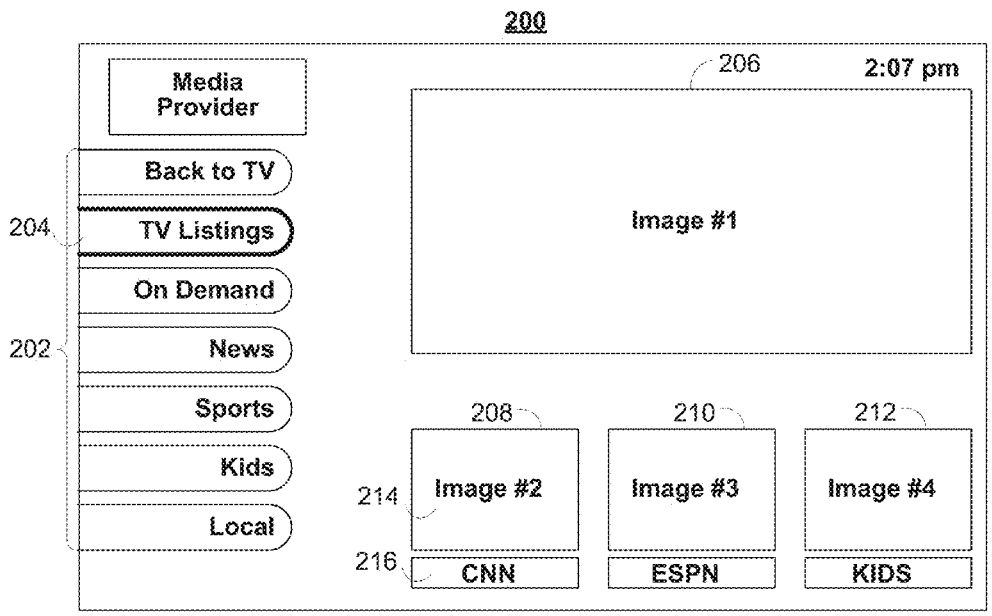
FIG. 2 shows another illustrative example of a display screen used access media content in accordance with some embodiments of the disclosure.

FIGS. 1-2 show illustrative display screens that may be used to provide media guidance data and media assets. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criterion.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

In some embodiments, options region 126 may include an option to provide a group recommendation, for example, through group recommendation setup screen 500 discussed below in relation to FIG. 5. In some embodiments, a user may request the group recommendation through a selectable option in options region 126 or through a dedicated button on a user input device, such as a remote control. In response to requesting a group recommendation, the media guidance application may present group recommendation setup screen 500. In other embodiments, the media guidance application may overlay group recommendation icons over the program listings, as discussed below in relation to FIG. 7. In yet other embodiments, the group recommendations may be provided in other guidance screens. For example, the user may select listing 108 to request further information about "The Simpsons." In response to the user's request for further information, the media guidance application may present a media progress bar, such as the media progress bar 600 discussed below in relation to FIG. 6. In some embodiments, the progress bar may be overlayed onto video region 122 or a currently displaying full-screen program.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

In some embodiments, the media guidance application may automatically compile information regarding the prior viewing histories of the user. For example, when the user watches a certain portion of a media asset, the media guidance application may record the start time and stop time that the user watched the media asset. The media guidance application may also record user inputs such as start, stop, pause, fast forward, or rewind, among others, and may also detect whether the user is currently watching the display, for example through detection module 316 discussed further below.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

The media guidance application may also store or automatically compile user profiles for more than one user. The media guidance application may store one or more user profiles for each individual. Furthermore, the media guidance application may detect, for example using detection module 316, which individuals are currently watching the media asset. As an illustrative example, media guidance application may determine, based on the time of day, that certain individuals are likely to be watching the media asset, and may track the eye movement of one or more individuals currently watching the screen. In this manner, the media guidance application may deduce that, for instance, two individuals, likely Mom and Dad, are watching television. Thus, the media guidance application may provide suitable group recommendations based on who is in the group, taking into account the differing user preferences and prior viewing histories of each of the individuals in the group as recorded in their respective user profiles.

Another display arrangement for providing media guidance is shown in FIG. 2. Video mosaic display 200 includes selectable options 202 for content information organized based on content type, genre, and/or other organization criterion. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

In some embodiments, listings 206, 208, 210, and 212 may represent group recommendations as determined by the systems and methods described herein. For example, listing 206 may be larger than listings 208, 210, and 212 because it is the highest ranked listing, and thus most likely to be the most desirable recommendation. As described herein, the media guidance application may automatically determine the composition of the group currently consuming the media and automatically determine the listings 206, 208, 210, and 212 to recommend to the group.

Figure 3:
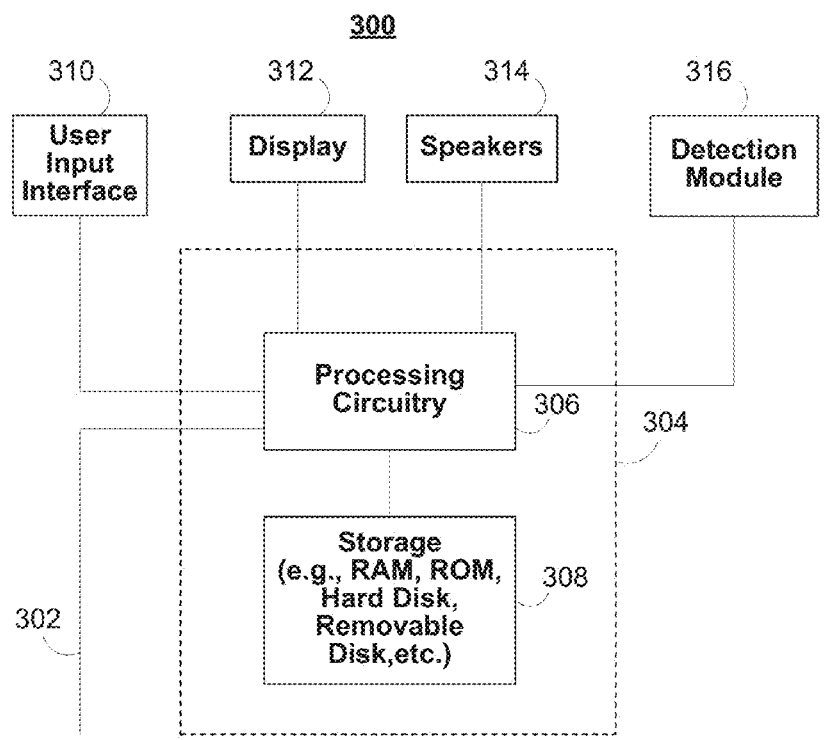
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Detection module 316, or the detection module circuitry, may be incorporated into, coupled to, or accessible by the media guidance application (e.g., via control circuitry 304). Detection module 316 may be used to identify and monitor one or more users. For example, the detection module may comprise a camera and/or a light source for detecting and tracking movement. Detection module 316 may use any suitable sensor to detect movement, including, but not limited to, an optical sensor or an infrared sensor. In some embodiments, the detection module 316 may detect movement at a specific frequency or framerate, and the frequency or framerate may be either fixed or variable. For example, the movement sensor may detect movement at a first framerate, and in response to detecting movement of a user (e.g., walking into a room), the movement sensor may increase the framerate to a second framerate that is higher than the first framerate. The movement sensor may continue to detect movement at the second, increased framerate for a set period of time before reverting to the first framerate. The movement sensor may revert back to the first framerate after a period of time of detecting no movement. In some embodiments, the detection module 316 may be configured to detect relatively large movements, such as a person walking into or out of a room. In other embodiments, the detection module 316 may be configured to detect relatively minute movements, such as tracking the eye movement of a user or a user's changing facial expressions.

Detection module 316 may also comprise an audio sensor for detecting sounds from the user or the user's environment. The audio sensor may detect volume, frequency, pitch, tone, or any other audio characteristics. As an illustrative example, detection module 316 may detect the voices of one or more users in the room, and the processing circuitry 306 may user voice recognition software to determine who is currently in the room. The media guidance application may further be configured with speech recognition software to enable the media guidance application to recognize any words or phrases spoken by the user.

In some embodiments, the media guidance application may receive information from a particular source (e.g., a website, a profile associated with a user, a content provider, a social media network, etc.) for use in determining the context of the media asset or a portion of the media asset or to monitor for user interest in a particular portion of the media asset.

For example, the media guidance application may retrieve a list of friends (e.g., a social network buddy list), contacts (e.g., retrieved from a phone/text message/e-mail account associated with the user), and/or other listings featuring other entities with known associations to the user and obtain information about a media asset such as what portions, if any, were important to one or more plotlines of the media asset, what portions were interesting (or not interesting) to users associated with the current user, what portions may be skipped or fast-forwarded through, etc.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
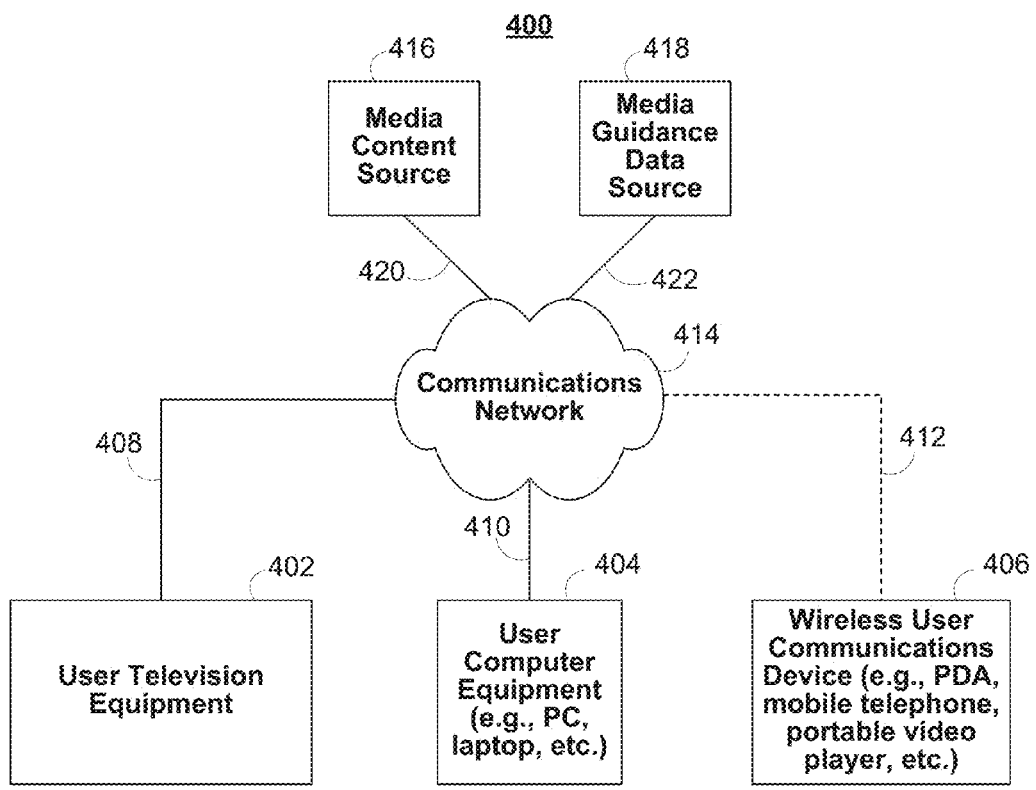
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively.

Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
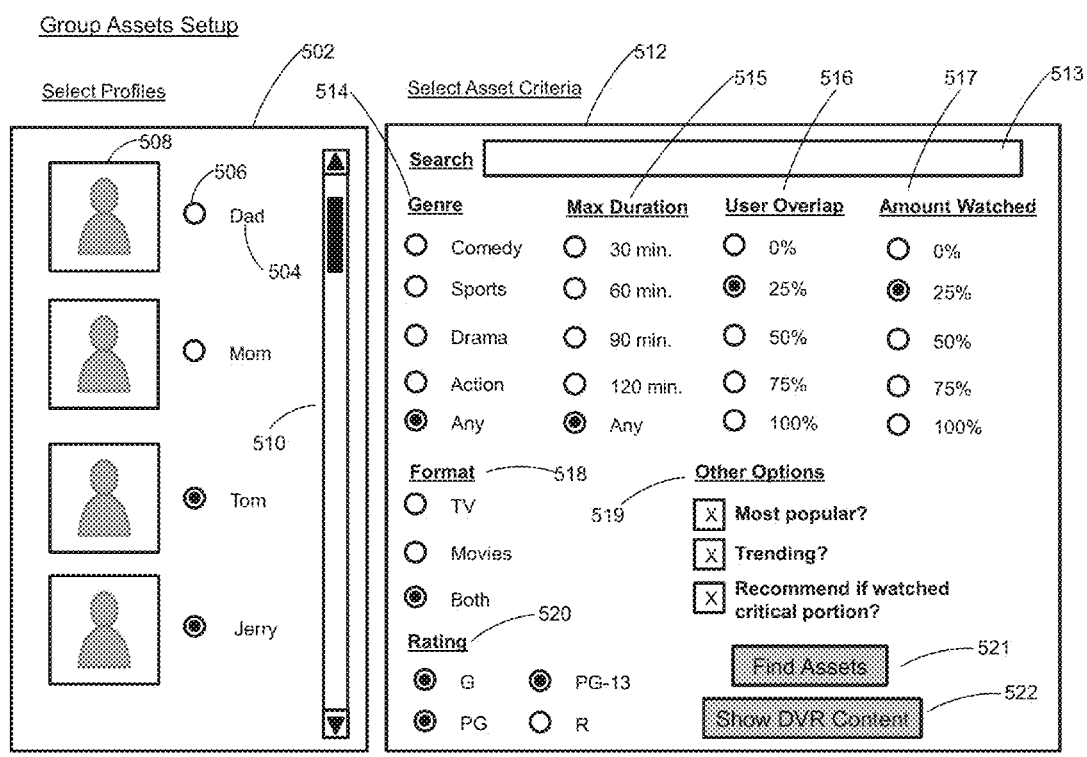
FIG. 5 shows an illustrative setup screen for group media asset recommendations in accordance with some embodiments of the disclosure.

FIG. 5 shows an illustrative setup screen 500 for group media asset recommendations in accordance with some embodiments of the disclosure. Group recommendation setup screen 500 is provided for illustrative purposes only, and it will be understood by one of ordinary skill that variations in the features, functions, and layout will not depart from the scope of the disclosure herein. Group recommendation setup screen 500 includes profile selection screen 502, comprising profile names 504, profile icons 508, radio buttons 506, and scroll bar 510. Select asset criteria screen 512 comprises search bar 513, genre options 514, max duration options 515, user overlap options 516, amount watched options 517, format options 518, other options 519, rating options 520, find assets button 521, and show DVR content 522.

Profile selection screen 502 may be used to select the profile(s) that comprise the group. A user may interact with profile selection screen 502 using any suitable input device, including, but not limited to, a remote control, a keyboard, or a mouse. A user may select the individuals that comprise the group by selecting radio buttons 506. In some embodiments, the radio buttons 506 may be replaced with any other suitable mechanism for selecting profiles. In some embodiments, the profile names 504 may be selectable indicators to select the profile. In some embodiments, each profile may have a profile picture, icon, or other indicator associated with the profile, such as profile icons 508. Profile icons 508 may be any suitable picture or media for representing the profile. For example, profile icons 508 may be a photograph of the respective user's face. The user may scroll through the list of profiles using scroll bar 510. The profile selection screen 502 may also include options, not shown, for adding or importing profiles. For example, the media guidance application may automatically populate the list of profiles from a social network, such as Facebook.

Select asset criteria screen 512 may comprise a plurality of options for customizing the group recommendation. Select asset criteria screen 512 may also allow the user to filter available shows, shows stored on local storage, such as the user's DVR. The criteria shown in FIG. 5 are for illustrative purposes only, and any suitable criteria may be shown in this screen. Search bar 513 may allow the user to input keywords for desired assets, including, but not limited to, title, actor/actresses, or subject matter keywords. In some embodiments, the user may select search bar 513 and enter text using a user input device, such as a remote control. In other embodiments, the search bar 513 may allow for voice input using suitable voice/speech recognition software. Genre options 514 may allow the user to select one or more genres that are desired for the group recommendation. The genre options 514 have associated radio buttons, but any suitable mechanism for selecting the genre options 514 may be implemented.

Max duration options 515 may allow the user to filter the search results to return only media assets that are below a certain duration. User overlap options 516 may allow a user to select the minimum overlap for the recommended media assets. The selected minimum overlap may indicate a threshold that each individual in the group must have before watching a media asset. For example, for a group of two people and a minimum overlap of 25%, each user must have watched the same 25% of the media asset. Thus, if both users have watched the first 15 minutes of a 1 hour program, but no more than that, the program may be a suitable recommendation for the group because they can watch the remaining 45 minutes together. Amount watched options 517 may allow the user to request a media asset in which no individual in the group has consumed past a particular stop time. For example, the illustrative example depicted in FIG. 5 shows a furthest amount watched option of 25% selected. Thus, only media assets in which no individual in the group has watched past 25% of the media asset duration may be recommended. In this manner, the group may indicate their desire to limit how much any one person in the group has watched the recommended media assets. In some embodiments, the amount watched option 517 may be set to zero. In such embodiments, no one in the group may have seen the recommended media assets, and thus the recommendations may be made on other criteria, such as whether users have previously indicated an interest in the media asset, set a reminder, or previously recorded the media asset.

Format options 518 may allow the user to restrict the searched assets to television programs, movies, or any other media asset format or combination thereof. Ratings options 520 may allow the user to restrict the media recommendations based on parental controls. In the illustrative example depicted in FIG. 5, the ratings options 520 comprise viewing ratings, including G, PG, PG-13, and R. Any other suitable parental control options may be included, including options for violence, language, sexual content, or any other undesirable content. Although the genre options 514, max duration options 515, user overlap options 516, amount watched options 517, format options 518, and rating options 520 are shown with radio buttons, any mechanism for receiving the user's overlap selection may be implemented, such as a text entry area.

Other options 519 may allow the user to customize the group recommendation in other ways. For example, the user may select the most popular media during a certain time period that meets a certain threshold. The user may also select "trending" media assets that have been mentioned frequently on the Internet, social media, news outlets, or other sources. The user may also allow the group to limit the recommendation to media assets where no individual in the group has seen a critical portion of the media asset. As an illustrative example, the last 25% of a sports game may be particularly important to the group. If one person in the group has seen any portion past the last 25% of the game, then the game may not be suitable for recommendation to the group due to the lack of suspense. The critical portion may be a particular instant in time in the media asset or may be a portion less than the entire media asset. The critical portion may be denoted manually by a user or provided by a third party, such as a cable head-end, network provider, or other entity. Indications of the critical portion of a media asset may be received with the media asset, for example together with a broadcast or delivery of the media asset, or separately from the media asset. This information may be downloaded periodically or requested manually by the user. The user may request the media guidance application to provide the group recommendations by selecting the Find Assets button 532. In some embodiments, the select asset criteria screen 512 includes a show DVR content button 522 to allow the user to browse the content stored on the user's DVR without the selected criteria.

Figure 6:
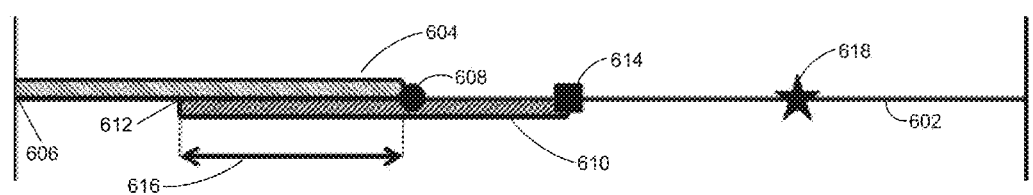
FIG. 6 shows an illustrative media progress bar in accordance with some embodiments of the disclosure.

FIG. 6 shows an illustrative media progress bar 600 in accordance with some embodiments of the disclosure. Media progress bar 600 may comprise timeline 602, a first amount of the media asset duration 604 comprising a first start time 606 and first stop time 608, a second amount of the media asset duration 610 comprising a second start time 612 and a second stop time 614, an overlap time period 616, and a critical portion indicator 618.

The timeline 602 may represent the duration of a media asset. The first amount of the media asset duration 604 may represent a portion of the media asset duration that a first user has watched the media asset. In some embodiments, the first amount of the media asset duration 604 is less than the entire duration of the media asset. The first amount of the media asset duration 604 may be highlighted by a particular color, shading, pattern, or any other distinguishing feature. The first amount of the media asset duration 604 may start at first start time 606 and end at first stop time 608. In some embodiments, the stop time 608 may be denoted by an indicator. The indicator may be a generic indicator or may be specific to the first user.

The second amount of the media asset duration 610 may represent a portion of the media asset duration that a second user has watched the media asset. In some embodiments, the second amount of the media asset duration 610 is less than the entire duration of the media asset. The second amount of the media asset duration 610 may be highlighted by a particular color, shading, pattern, or any other distinguishing feature. The second amount of the media asset duration 610 may start at second start time 612 and end at second stop time 614. In some embodiments, the second stop time 614 may be denoted by an indicator. The indicator may be a generic indicator or may be specific to the second user.

In some embodiments, the second amount of the duration of the media asset 610 is visually distinguished from the first amount of the duration of the media asset 604 and/or positioned differently on the timeline 602. In some embodiments, the overlap potion 616 is visually distinguished from the remainder of the timeline (the non-overlapping portions of the media asset). Thus, the group may quickly determine a portion of the media asset that both the first user and the second user have watched together. Furthermore, a critical portion indicator 618 may be placed on timeline 602, and the group and/or media guidance application may determine, based on the relative position of the first amount of the duration of the media asset 604 and the second amount of the duration of the media asset 610 whether at least one of the first user and the second user has watched the critical portion of the media asset.

In some embodiments, one or more users may add respective indicators on the timeline 602. These users may or may not be associated with a stored user profile. Corresponding indicators for the start, stop, and duration of the media asset that the user consumed may be added. The indicators may be added in any suitable fashion. For example, the user may add indicators by selecting an option in options region 126 or by selected a dedicated button on a remote control. In some embodiments, the user may type a username to associate with the added indicators. In some embodiments, the media guidance application may use predictive word recognition software to provide recommendations for usernames. In some embodiments, the media guidance application may provide a list of available profiles stored locally and allow the user to select from the list of available profiles to add their respective indicators to the timeline 602.

The media progress bar 600 may be displayed at any suitable time and on any suitable media guidance screen. For example, the media progress bar 600 may be overlaid on top of a currently displaying media asset. In some embodiments, the media progress bar 600 may be shown with a media asset that is currently being consumed and may indicate a current position of one or more users. For example, one or more of the first start time 606, second start time 612, first stop time 608 and/or the second stop time 614 may update and move across the timeline 602 in real-time as users are watching a media asset. In some embodiments, one or more users may partially consume a media asset, select pause or stop, and resume watching the media asset at a later time. When the partially-consumed media asset is selected to resume consumption, the media asset may begin playback at the earliest point that all users in the group have consumed. One or more media progress bars 600 may also be displayed, for example, overlaid on top of each respective listing in the grid guide depicted in FIG. 1. In such embodiments, the user may toggle the display of the media progress bars 600, for example, by selecting an option in options region 126 or by selecting a dedicated button on a remote control.

Figure 7:
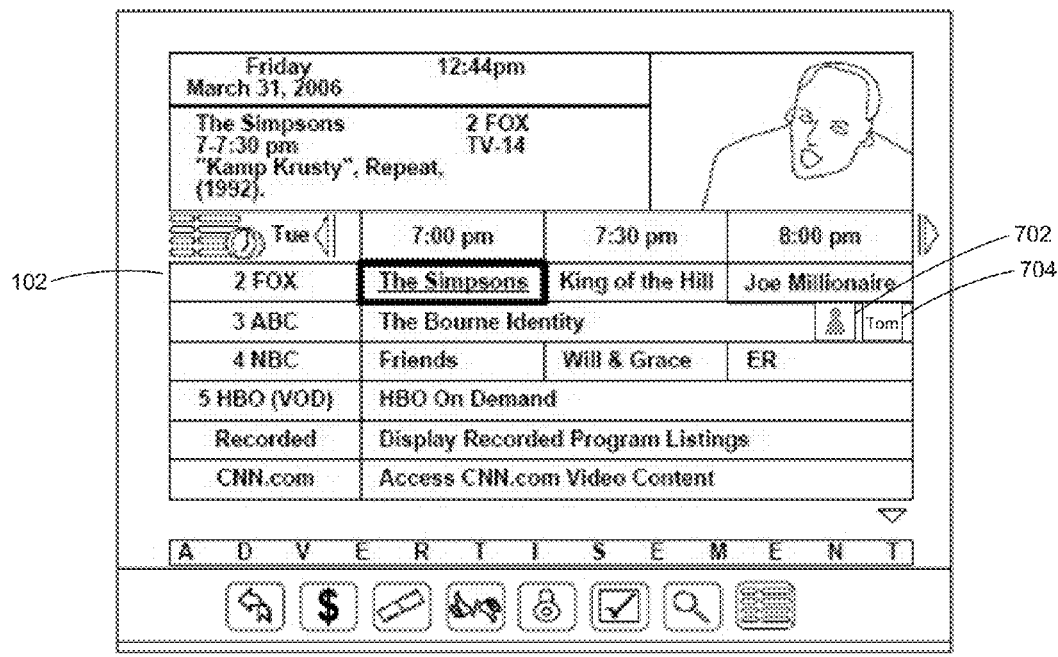
FIG. 7 shows an illustrative example of a display screen for use in accessing media content including group media recommendation icons in accordance with some embodiments of the disclosure.

FIG. 7 shows an illustrative example of a display screen 700 for use in accessing media content including group media recommendation icons in accordance with some embodiments of the disclosure. The grid guide shown in display screen 700 may be substantially similar to the grid guide depicted in FIG. 1. The grid guide may include one or more icons 702 and 704 to represent a group recommendation. For example, the icons 702 and 704 may be miniature versions of the profile pictures 508 and be selected for the group that is recommended for the particular listing. In this manner, the grid guide may provide recommendations for a particular group to watch a particular listing. In another embodiment, the icons 702 and 704 may be a media progress bar 600 for the program associated with the listing. In some embodiments, the icons 702 and 704 may be generic icons (such as a check mark) which denote that the program associated with the listing is recommended, or that a group recommendation is available. In some embodiments, listings in the grid guide with available group recommendations may be visually distinguished from listings which do not have group recommendations (or which are not recommended for the current group). For example, listings associated with programs which are recommended for currently detected group may be highlighted in a different color than listings associated with programs which are not recommended.

In some embodiments, a user may add his or her indicator to one or more program listings in the grid guide depicted in FIG. 7. In this manner, the user may manually indicate an interest in watching the program associated with the program listing at a future time. In some embodiments, the icons 702 and 704 may indicate who has yet to watch the media asset associated with the program listing, who has partially watched the media asset, and who has completely watched the media asset. The icons 702 and 704 may visually distinguish or "cross-off" the icons of people who have not yet watched, have partially watched, and have completely watched the media asset. The media guidance application may use any suitable method for the distinguishing visually distinguishing, including, for example, by different coloring, shading, patterns, or placement. In some embodiments, the media guidance application may receive a user input indicating that the user has watched the media asset associated with the listing, and in response, the media guidance application may update the icon to indicate that the associated user has watched the media asset. For example, the media guidance application may list the profiles associated with the media listing and allow the profiles to be "crossed-off" in any suitable manner, including, but not limited to selectable profile buttons, radial buttons, a drop-down menu, assigned number or letter keys on a remote control. In some embodiments, the media guidance application may utilize detection module 316 to detect user speech and cross-off a profile in response to detecting certain keywords. For example, a user might say "I watched American Idol," or "Cross-off Tom from American Idol," and in response, the media guidance application may mark the appropriate user profile as having completely watched the media asset. In some embodiments, the media guidance application may receive a user input to indicate that they partially watched a media asset. For example, the media guidance application may receive, in any suitable manner, at least one of a start time and an end time from a user and add appropriate indicators for the user on the timeline 602.

In some embodiments, the grid guide depicted in FIG. 7 may include one or more listings that correspond to programs recorded and stored on user equipment, such as storage 308 depicted in FIG. 3. In such instances, the user equipment may receive an instruction to delete a media asset, for example through user input interface 310. In some embodiments, the media guidance application may generate an alert if at least one user in the group has not completely watched the media asset. For example, if Tom has completely watched a media asset and wishes to delete the media asset, but Jerry has only partially watched the media asset, the media guidance application may generate a message to Tom that indicates that Jerry has not yet completely watched the media asset (e.g., "Jerry has not yet viewed this program. Do you still wish to delete?"). The message may be provided to Tom in response to a user input to delete the media asset, and may pop-up as an overlay onto the screen. Similarly, the media guidance application may generate an alert if at least one user in the group has not watched a critical portion of the media asset, as indicated by critical portion indicator 618 in FIG. 6. For instance, if not everyone in the group has watched the ending of American Idol, the media guidance application may generate an alert in response to a user command to delete American Idol from the user's DVR. In some embodiments, the media guidance application may automatically delete a media asset from local storage if all users in a group have completely consumed the media asset, or if all users in the group have consumed a critical portion of the media asset.

FIG. 8 shows an illustrative screen 800 for providing group asset recommendations in accordance with some embodiments of the disclosure. Group assets screen 802 includes a list of recommended assets 804, asset drop-down button 805, progress bars 806, critical portion indicator 807, available source indicator 808, user overlap indicator 810, furthest watched indicator 812, genre indicator 814, and key 816.

The list of recommended assets 804 may include the media assets that satisfy the recommendation criteria selected in asset criteria screen 512 depicted in FIG. 5. In other embodiments, the group assets screen 802 may be shown in response to the user selecting the "Show DVR Content" button 522. In such embodiments, the list of assets 804 may be a list of assets stored on the user's DVR with associated progress bars. In this manner, a user or group of users may browse the contents of the user's DVR and quickly determine assets which some or all of the members of the group have previously seen.

Progress bars 806 may be substantially similar to the media progress bar 600 depicted in FIG. 6. Each of the progress bars 806 may correspond to one of the recommended assets in list 804. In this manner, the group may quickly see the portions of the media asset that each individual has watched. In some embodiments, the overlap portions where two or more individuals of the group have watched may be visually distinguished from non-overlap portions. The overlap may be indicated by overlap indicator 810. In some embodiments, the user may select drop-down button 805 to see individual progress bars for each user. The key 816 may provide information on the visually distinguished features of the progress bars 806. In the illustrative example depicted in FIG. 8, bars for users Tom and Jerry are depicted in the progress bar, with a key included to inform the user about the different shading used for each user. In some embodiments, the user names may be overlaid on each of the progress bars.

The time and/or media source that each recommended media asset is available may be denoted by available source indicator 808. In some embodiments, the media source may include names of channels or Internet media providers. In some embodiments, a media asset may be available on-demand, as denoted by the "video on demand" or "VOD" indicator. The furthest stop time that any individual in the group has watched may be denoted by the furthest watched indicator 812. Finally, the genre of each recommended media asset may be denoted by genre indicator 814. The indicators 808, 810, 812, and 814 are shown as an illustrative example only. Any other combination of features, information, or criteria may be displayed in screen 802 as appropriate.

FIG. 9 is a flowchart of illustrative steps for providing a recommendation for a media asset to a group in accordance with some embodiments of the disclosure. Process 900 includes identifying a group comprising at least a first user and a second user at step 902, selecting a media asset of which the first and second users have previously accessed less than a duration of the media asset at step 904, determining a first amount of the media asset duration that the first user has accessed the media asset at step 906, determining a second amount of the media asset duration that the second user has accessed the media asset at step 908, and based on the first and second amounts of the media asset duration, providing a recommendation for the media asset to the group at step 910.

At step 902, a media guidance application may identify (e.g., via control circuitry 304 (FIG. 3)), a group comprising at least a first user and a second user. As discussed above, the group composition may be input manually by the users, or the media guidance application may determine the group automatically. For example, a user may select user profiles, for example in profile selection screen 502, to indicate the group composition. In other embodiments, the media guidance application may automatically detect users in the group. For example, the media guidance application may use detection module 316 to detect user movement and/or sounds from the user or the user's environment to determine the individuals that are present.

At step 904, the media guidance application may select (e.g., via control circuitry 304 (FIG. 3)) a media asset of which the first and second users have previously accessed less than a duration of the media asset. For example, the first and second users may have each only partially watched a media asset. At step 906, the media guidance application may determine (e.g., via control circuitry 304 (FIG. 3)) a first amount of the media asset duration that the first user has accessed the media asset, and at step 908, the media guidance application may determine (e.g., via control circuitry 304 (FIG. 3)) a second amount of the media asset duration that the second user has accessed the media asset.

At step 910, the media guidance application may provide (e.g., via control circuitry 304 (FIG. 3)) a recommendation for the media asset to the group based on the first and second amounts of the media asset duration. For example, the media guidance application may compare the first and second amounts of the media asset duration to determine whether an overlap portion exceeds a threshold. In some embodiments, the media guidance application may compare the respective start and stop times of the first and second amounts of the media asset duration. For instance, the media guidance application may subtract the stop time of the first amount of the media asset duration from the stop time of the second amount of the media asset duration. If the difference exceeds a threshold, the media guidance application may not recommend the media asset, thereby denoting that the prior viewing history of the first and second users is too disparate to justify a recommendation. In some embodiments, the media guidance application may compare the respective stop times of the first and the second amounts of the media asset duration to determine whether at least one of the first and the second user has consumed a critical portion of the media asset. If at least one of the first and the second users has consumed a critical portion of the media asset, then the media guidance application may not recommend the media asset. A media asset may include one or more critical portions.

FIG. 10 is a flowchart of another set of illustrative steps for providing a recommendation for media assets to a group in accordance with some embodiments of the disclosure. Process 1000 includes identifying a plurality of media assets that both a first user and a second user have previously accessed less than a duration of the media asset at step 1002, selecting a media asset and determining an overlap time period where both the first and second user have accessed the selected media asset at step 1004, and determining whether the overlap time period exceeds a threshold at step 1006. Process 1000 further includes determining whether at least one of the first or the second user has watched a critical portion of the selected media asset at step 1008 and adding the selected media asset to a list of recommended media assets at step 1010. Process 1000 includes determining whether unselected media assets remain in the plurality of media assets at step 1012 and determining whether other recommendation criteria exist at step 1014. Process 1000 includes ranking recommended media assets based on overlap time period and other criteria at step 1016 and ranking the recommended media assets based on overlap time period at step 1018. Finally, process 1000 includes generating for display the list of recommended media assets at step 1020 and visually distinguishing the overlap time period from a non-overlap time period at step 1022.

At step 1002, a media guidance application may identify (e.g., via control circuitry 304 (FIG. 3)) a plurality of media assets that both a first user and a second user have previously accessed less than a duration of the media asset at step 1002. Step 1002 may be substantially similar to step 904 depicted in FIG. 9. At step 904, the media guidance application may select (e.g., via control circuitry 304 (FIG. 3)) a media asset from the plurality of media assets and determine an overlap time period where both the first and second user have accessed the selected media asset. In some embodiments, there may be more than one overlap time period. In such embodiments, the overlap time periods may be combined to provide an aggregate overlap value. In other embodiments, each overlap time may be considered individually. At step 1006, the media guidance application may determine (e.g., via control circuitry 304 (FIG. 3)) whether the overlap time period(s) exceeds a threshold. The threshold may be provided by a user (e.g., manually input by the user) or by a third-party. If the overlap time period fails to exceed the threshold, then the media guidance application may proceed back to step 1004 and select a different media asset of the plurality of media assets. If the overlap time period exceeds the threshold, then the media guidance application may proceed to step 1008 and determine (e.g., via control circuitry 304 (FIG. 3)) whether at least one of the first and the second user has watched a critical portion. If at least one of the first and the second user has watched the critical portion, then the media guidance application may proceed back to step 1004 and select a different media asset of the plurality of media assets. If neither the first or the second user has watched the critical portion, then the media guidance application may proceed to step 1010 and add (e.g., via control circuitry 304 (FIG. 3)) the selected media asset to a list of recommended media assets. At step 1012, the media guidance application may determine whether unselected media assets remain in the plurality of identified media assets. If all of the plurality of media assets have been considered, then the media guidance application may proceed to step 1014. If unselected media assets remain, then the media guidance application may proceed back to step 1004 and select a different media asset of the plurality of media assets.

At step 1014, the media guidance application may determine (e.g., via control circuitry 304 (FIG. 3)) whether other recommendation criteria exist. For example, a user may have input genre, parental control, or furthest amount criteria as depicted in the illustrative example of FIG. 5. If no other recommendation criteria exists, then the media guidance application may proceed to step 1018 and rank (e.g., via control circuitry 304 (FIG. 3)) the recommended media assets based on the overlap time period. For example, the list of recommended media assets may be ranked according to descending overlap time, such that the media assets corresponding to the largest overlap time are the highest ranked. If other recommendation criteria exists, then the media guidance application may proceed to step 1016 and rank (e.g., via control circuitry 304 (FIG. 3)) the recommended media assets based on the overlap time period and the other criteria. For example, the media guidance application may calculate a rank value for each recommended media asset. The rank value may be calculated in any suitable fashion. For example, the media guidance application may assign point values to each recommendation criteria and determine, for each recommended media asset, how many of the recommendation criteria the media asset matches. The media guidance application may them perform a weighted average of the point values. For instance, genre and overlap time information for each recommended media asset may be combined, with overlap time weighted as 70% of the rank value and genre matching as 30% of the rank value. The recommended media assets may then be sorted by rank value. In some embodiments, individual rank values may be calculated separately for each user in the group, and a group rank value calculated based on the individual rank values. In some embodiments, the individual rank values, group rank value, or both, may be displayed in group assets screen 802 for each asset. For instance, the individual/group rank values may be displayed as a percentage, with a higher percentage indicating a better match for the group.

In some embodiments, the individual/group rank values may be calculated based at least in part on the prior viewing histories of the users in the group. For instance, the media guidance application may determine that both users in a two-person group have seen other episodes in the same series as a recommended media asset. In such instance, the rank value may be increased based on the number of other episodes in the series that the users have watched.

At step 1020, the media guidance application may generate for display (e.g., on display 312 (FIG. 3)) the list of recommended media assets at step 1020. The list of recommended media assets may be provided in a screen substantially similar to the group asset recommendation screen depicted in FIG. 8. In other embodiments, the recommended media assets may be provided as part of an electronic program guide. For example, icons may be overlaid for each of the recommended media assets, as discussed above in relation to FIG. 7. At step 1022, the media guidance application may visually distinguish (e.g., via control circuitry 304 (FIG. 3)) the overlap time period of each recommended media asset from a non-overlap time period. As discussed above, the media guidance application may visually distinguish the overlap time period from the non-overlap time period using any suitable approach, including, but not limited to, different color, shading, pattern, and/or placement.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing media recommendations for a group, the method comprising:
   identifying a group comprising at least a first user and a second user;
   retrieving, using control circuitry, from a database a list of media assets which the first and second users have previously accessed;
   searching the list of media assets, using the control circuitry, for a media asset of which the first and second users have previously accessed less than a duration of the media asset, the first and second users having previously accessed the media asset at different times;
   retrieving from storage, using the control circuitry, a first amount of the media asset duration that the first user has accessed the media asset, wherein the first amount is calculated based on a time that the first user stopped accessing the media asset;

retrieving from storage, using the control circuitry, a second amount of the media asset duration that the second user has accessed the media asset, wherein the second amount is different from the first amount, wherein the second amount is calculated based on a time that the second user stopped accessing the media asset; and applying, using the control circuitry, a criterion to the first and second amounts of the media asset duration to determine whether to generate a recommendation for the media asset to the group, wherein applying the criterion comprises determining whether a difference between the first amount of the media asset duration and the second amount of the media asset duration is below a threshold.

2. The method of claim 1, wherein applying the criterion further comprises at least one of: determining a difference between a stop time of the first amount of the media asset duration and a stop time of the second amount of the media asset duration, and determining a difference between a start time of the first amount of the media asset duration and a start time of the second amount of the media asset duration.

3. The method of claim 1 further comprising generating for display the first amount of the media asset duration and the second amount of the media asset duration.

4. The method of claim 1, further comprising:
determining an overlap time period in the media asset where both the first user and the second user have accessed the media asset based on the first and the second amounts of the media asset duration;
determining a non-overlap time period in the media asset where at least one of the first user and the second user have not accessed the media asset; and
visually distinguishing the overlap time period from the non-overlap time period.

5. The method of claim 1, wherein the first and the second amounts of the media asset duration are displayed in a bar graph.

6. The method of claim 1 further comprising:
determining, for each media asset in a plurality of media assets, an amount of time that the first user has accessed of each media asset and an amount of time that the second user has accessed of each media asset; and
ranking the plurality of media assets based on the amount of time that the first user has accessed each media asset and the amount of time that the second user has accessed each media asset.

7. The method of claim 1, wherein at least one of the first and the second amounts of the media asset duration is less than the entire media asset.

8. The method of claim 1, wherein identifying the group comprises receiving an indication of interest in the media asset from at least one of the first user and the second user.

9. The method of claim 1, wherein applying the criterion comprises determining whether at least one of the first user or the second user has accessed a critical portion of the media asset.

10. A system for providing media recommendations for a group, the system comprising:
control circuitry configured to:
identify a group comprising at least a first user and a second user; retrieve
from a database a list of media assets which the first and second users have previously accessed;
search the list of media assets for a media asset of which the first and second users have previously accessed less than a duration of the media asset, the first and second users having previously accessed the media asset at different times;
retrieve from storage a first amount of the media asset duration that the first user has accessed the media asset, wherein the first amount is calculated based on a time that the first user stopped accessing the media asset;
retrieve from storage a second amount of the media asset duration that the second user has accessed the media asset, wherein the second amount is different from the first amount, wherein the second amount is calculated based on a time that the second user stopped accessing the media asset; and
applying a criterion to the first and second amounts of the media asset duration to determine whether to generate a recommendation for the media asset to the group, wherein applying the criterion comprises determining whether a difference between the first amount of the media asset duration and the second amount of the media asset duration is below a threshold.

11. The system of claim 10, wherein the control circuitry is further configured to apply the criterion by performing at least one of: determining a difference between a stop time of the first amount of the media asset duration and a stop time of the second amount of the media asset duration, and determining a difference between a start time of the first amount of the media asset duration and a start time of the second amount of the media asset duration.

12. The system of claim 10 wherein the control circuitry is further configured to generate for display the first amount of the media asset duration and the second amount of the media asset duration.

13. The system of claim 10, wherein the control circuitry is further configured to:
determine an overlap time period in the media asset where both the first user and the second user have accessed the media asset based on the first and the second amounts of the media asset duration;
determine a non-overlap time period in the media asset where at least one of the first user and the second user have not accessed the media asset; and
visually distinguish the overlap time period from the non-overlap time period.

14. The system of claim 10, wherein the first and the second amounts of the media asset duration are displayed in a bar graph.

15. The system of claim 10, wherein the control circuitry is further configured to:
determine, for each media asset in a plurality of media assets, an amount of time that the first user has accessed of each media asset and an amount of time that the second user has accessed of each media asset; and
rank the plurality of media assets based on the amount of time that the first user has accessed each media asset and the amount of time that the second user has accessed each media asset.

16. The system of claim 10, wherein at least one of the first and the second amounts of the media asset duration is less than the entire media asset.

17. The system of claim 10, wherein the control circuitry is configured to identify the group by receiving an indication of interest in the media asset from at least one of the first user and the second user.

18. The system of claim 10, wherein the control circuitry is configured to apply the criterion by determining whether at least one of the first user or the second user has accessed a critical portion of the media asset.

* * * * *